(12) United States Patent
Kelemen et al.

(10) Patent No.: US 9,657,559 B2
(45) Date of Patent: May 23, 2017

(54) METHODS AND SYSTEMS FOR CAUSING REACTION DRIVEN CRACKING IN SUBSURFACE ROCK FORMATIONS

(71) Applicant: The Trustees of Columbia University in the City of New York, New York, NY (US)

(72) Inventors: Peter Kelemen, Hastings on Hudson, NY (US); Heather Savage, Nyack, NY (US); Theodore A. Koczynski, Congers, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 36 days.

(21) Appl. No.: 14/395,529

(22) PCT Filed: Apr. 29, 2013

(86) PCT No.: PCT/US2013/038622
§ 371 (c)(1),
(2) Date: Oct. 20, 2014

(87) PCT Pub. No.: WO2013/163645
PCT Pub. Date: Oct. 31, 2013

(65) Prior Publication Data
US 2015/0129209 A1    May 14, 2015

Related U.S. Application Data

(60) Provisional application No. 61/673,825, filed on Jul. 20, 2012, provisional application No. 61/639,146, filed on Apr. 27, 2012.

(51) Int. Cl.
*E21B 43/26* (2006.01)
*C09K 8/62* (2006.01)
(Continued)

(52) U.S. Cl.
CPC .............. *E21B 43/26* (2013.01); *C09K 8/62* (2013.01); *E21B 43/164* (2013.01); *E21B 43/2405* (2013.01)

(58) Field of Classification Search
CPC ..... E21B 43/26; E21B 43/164; E21B 43/2405
See application file for complete search history.

(56) References Cited

U.S. PATENT DOCUMENTS

| | | | |
|---|---|---|---|
| 4,579,391 A * | 4/1986 | Mouat | E21B 36/04 166/248 |
| 5,363,919 A | 11/1994 | Jennings, Jr. | |

(Continued)

FOREIGN PATENT DOCUMENTS

| | | | |
|---|---|---|---|
| WO | 2011005831 A1 | 1/2011 | |
| WO | WO 2011005831 A1 * | 1/2011 | C01B 31/24 |

OTHER PUBLICATIONS

International Search Report and The Written Opinion of the International Searching Authority, International Application No. PCT/US/2013/038622, filed Apr. 29, 2013, mailed Aug. 16, 2013.

*Primary Examiner* — Catherine Loikith
(74) *Attorney, Agent, or Firm* — Murtha Cullina LLP; Anthony P. Gangemi

(57) ABSTRACT

Methods and systems for causing reaction driven cracking in subsurface rock formations are disclosed. In some embodiments, the methods include the following: drilling one or more holes in a substantially porous subsurface rock formation, the one or more holes in fluid communication with pores in the subsurface rock formation; injecting in the pores via at least one of the holes one or more fluids, wherein the one or more fluids include a gas; and chemically reacting the one or more fluids within the pores thereby causing cracking in the substantially porous subsurface rock formation.

20 Claims, 2 Drawing Sheets

(51) Int. Cl.
*E21B 43/16* (2006.01)
*E21B 43/24* (2006.01)

(56) References Cited

U.S. PATENT DOCUMENTS

| | | | |
|---|---|---|---|
| 6,648,551 | B1 | 11/2003 | Taylor |
| 9,193,594 | B2 * | 11/2015 | Kelemen ................ C01B 31/24 |
| 2010/0078172 | A1 | 4/2010 | Stine et al. |
| 2011/0114320 | A1 | 5/2011 | Sponchia et al. |

* cited by examiner

METHODS AND SYSTEMS FOR CAUSING REACTION DRIVEN CRACKING IN SUBSURFACE ROCK FORMATIONS

CROSS REFERENCE TO RELATED APPLICATION(S)

This application claims the benefit of U.S. Provisional Application Nos. 61/639,146, filed Apr. 27, 2012, and 61/673,825, filed Jul. 20, 2012, each of which is incorporated by reference as if disclosed herein in its entirety.

BACKGROUND

Induced fracture in hydrocarbon reservoirs, geothermal source rocks, and carbon storage sites is most commonly accomplished via hydraulic fracture techniques. These are profitable and widely employed in all three applications, but fall far short of optimal efficiency in extracting hydrocarbons, extracting heat, or injecting $CO_2$, because (1) it is very difficult to achieve fracture spacing less than approximately 1 meter via this method, (2) a few fractures with high conductivity capture most of the fluid flow, 3) without reactive cracking, in situ mineral carbonation fills pore space and armors reactive surfaces thus reducing the overall amount of carbonation and/or requiring additional hydraulic fracturing, and (4) there are real and perceived risks of induced seismicity and groundwater contamination. Other reservoir stimulation techniques, via thermal cracking, acidification to produce "wormholes," etc., have been considered but are not widely deployed.

Many unconventional reservoirs are characterized by low permeability and require hydraulic stimulation. However, the spacing of hydraulic fractures generally exceeds one meter. Such fracture networks extract less than, e.g., 1% pore fluid/year, for fluid pressure in fractures 10 MPa lower than rock, viscosity 0.001 Pa s, porosity 1%, and permeability 10-18 $m^2$. Also, high water pressure—required to fracture tight gas and oil reservoirs—can induce earthquakes. Hydraulic stimulation generally fails to produce sufficient connectivity between injection and production wells, transports fluid away from production wells, or creates a few large fractures around which thermal energy is rapidly extracted and exhausted.

SUMMARY

Methods and systems according to the disclosed subject matter are modeled on natural processes of reaction driven cracking, such as salt weathering. Some embodiments of methods and systems according to the disclosed subject matter include drilling one or more holes to inject two one or more gaseous and/or aqueous fluids, some of which contain non-toxic, readily obtained solutes, into a subsurface, porous rock formation. In some embodiments, fluids that are undersaturated in solid crystals are mixed and chemically react to form a combination that is strongly supersaturated. Injection may be simultaneous, along parallel flow paths, with a porous mixing region between the two paths, or sequential, with one fluid infusing pore space and a second one added later.

In some embodiments, examples of solutes used include the following: 1) dissolved lime (CaO, as $CA(OH)_2$ in solution) in one fluid and carbon dioxide ($CO_2$, as $HCO_3$ in solution) in the other, for which the combined solution will precipitate calcite or aragonite ($CaCO_3$); 2) dissolved periclase (MgO) and $CO_2$ to precipitate magnesite ($MgCO_3$); 3) $Na_2O$ and HCl to precipitate salt (NaCl); or $Na_2O$ and $SO_4$ to precipitate a range of sodium sulfate salts. Concentrations are typically chosen to optimize precipitation rates. Within the mixing zone between the two fluids, crystallization of solid minerals in pore space will lead to compressive stresses, and fracturing of rocks with crack spacing close to the pore scale.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
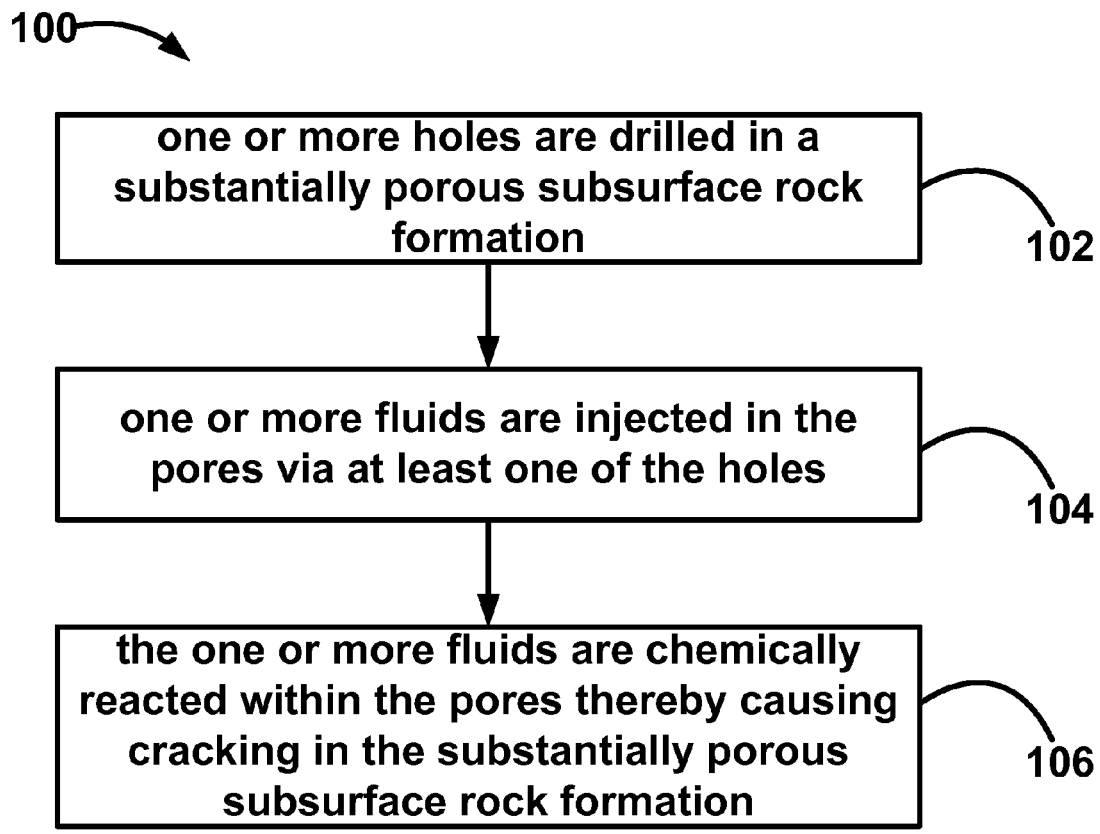
FIG. 1 is a chart of a method according to some embodiments of the disclosed subject matter.

Referring now to FIG. 1 aspects of the disclosed subject matter include a method 100 for causing reaction driven cracking in subsurface rock formations.

Crystallization of minerals from fluids in pore space causes fracture in natural processes such as frost wedging, salt weathering and hydrothermal alteration, producing interconnected crack networks at the pore scale. Crystallization from super-saturated solutions can cause local pressure gradients and differential stress, with magnitudes proportional to the log of the saturation state or free energy change. This stress can reach 10's to 100's of MPa, sufficient to fracture rocks, even at depths of several kilometers. This process has formed dense fracture networks with crack spacings, e.g., about 10 to 100 microns. Reaction driven cracking can maintain or enhance permeability and reactive surface area in a positive feedback mechanism.

At 102, one or more holes are drilled in a substantially porous subsurface rock formation. The one or more holes are in fluid communication with pores in the subsurface rock formation. At 104, one or more fluids are injected in the pores via at least one of the holes. The one or more fluids include at least one gas, e.g., carbon dioxide or nitrogen. In some embodiments, the one or more fluids are selected from reagents including dissolved lime, carbon dioxide, nitrogen gas, dissolved periclase, sodium oxide, hydrochloric acid, sulfate, hydrogen sulfate, sodium hydroxide, sodium choride-rich water, calcium hydroxide, substantially pure water, and a combination thereof. In some embodiments, the one or more fluids includes pairs of reagents including the following: 1) dissolved lime and carbon dioxide; 2) dissolved periclase and carbon dioxide; 3) sodium oxide and hydrochloric acid; 4) sodium oxide and sulfate; and 5) a combination thereof.

At 106, the one or more fluids are chemically reacted within the pores thereby causing cracking in the substantially porous subsurface rock formation. In some embodiments, the one or more fluids includes pairs of reagents that precipitate during the chemically reacting step to form at least one of calcite, aragonite, magnesite, salt, sodium sulfate salts, and a combination thereof. In some embodiments, dehydration reactions occur during the chemically reacting step, which cause large volume changes in the rock formation that result in cracking and fracturing of the rock formation.

In some embodiments, the one or more fluids include a first aqueous fluid including a non-toxic solute that is undersaturated in solid crystals and a second aqueous fluid including a non-toxic solute that is undersaturated in solid crystals. However, when mixed, chemical reactions occur between the first and second aqueous fluids to create a mixture or combination of the fluids that is strongly supersaturated. Concentrations of fluids are typically chosen to optimize precipitation rates. Within the mixing zone between the two fluids, crystallization of solid minerals in pore space will lead to compressive stresses and fracturing of rocks with crack spacing close to the pore scale.

In some embodiments, first and second substantially parallel holes are drilled in the rock formation and the one or more fluids are injected along substantially parallel flow paths through the first and second substantially parallel holes, respectively. Typically, the flow paths are positioned on opposite sides of a porous region within the rock formation. Mixing and chemical reactions of the one or more fluids occurs within the porous region.

In some embodiments, injection of the one or more fluids is substantially simultaneous. However, in other embodiments, injection of the one or more fluids is substantially sequential with a first fluid being injected first and a second fluid being injected at a later time.

Figure 2:
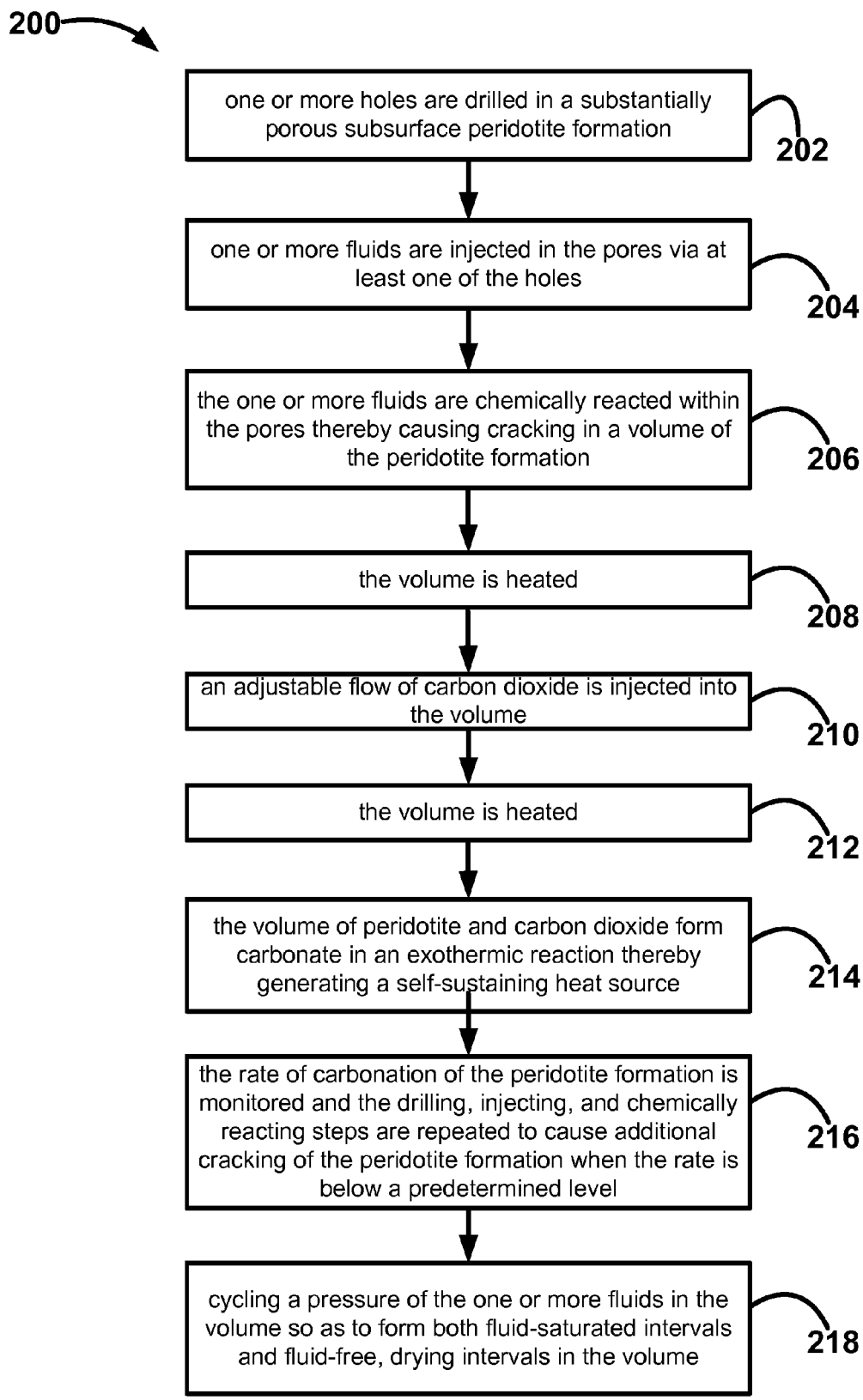
FIG. 2 is a chart of a method according to some embodiments of the disclosed subject matter.

Referring now to FIG. 2, some embodiments include a method 200 of using reaction-driven cracking to enhance rates of carbonation of peridotite.

As described in U.S. patent application Ser. No. 12/810,153, filed on Jun. 23, 2010, and Ser. No. 13/383,082, filed on Jan. 9, 2012, each of which is incorporated by reference as if disclosed herein in its entirety, known methods and systems include injecting carbon dioxide into peridotite formations and creating conditions that promote carbonation between the carbon dioxide and peridotite. However, known methods and systems primarily rely on the use of conventional drilling techniques, e.g., hydraulic drilling, to fracture the peridotite, which is expensive and often does not produce a volume of peridotite that is uniformly fractured.

At 202, one or more holes are drilled in a substantially porous subsurface peridotite formation. The one or more holes are in fluid communication with the pores in the peridotite formation. At 204, one or more fluids are injected in the pores via at least one of the holes. At 206, the one or more fluids are chemically reacted within the pores thereby causing cracking in a volume of the peridotite formation. At 208, the volume is heated. At 210, an adjustable flow of carbon dioxide is injected into the volume. At 212, bicarbonate materials are injected into the volume. At 214, the volume of peridotite and carbon dioxide form carbonate in an exothermic reaction thereby generating a self-sustaining heat source. The heat source heats the volume. At 216, the rate of carbonation of the peridotite formation is monitored and the drilling, injecting, and chemically reacting steps, i.e., steps 202, 204, and 206, respectively, are repeated to cause additional cracking of the peridotite formation when the rate is below a predetermined level. At 218, in some embodiments, method 200 includes cycling a pressure of the one or more fluids in the volume so as to form both fluid-saturated intervals and fluid-free, drying intervals in the volume.

Reaction driven cracking according to systems and methods of the disclosed subject matter produce fracture spacings on the order of the pore scale provides improved production of unconventional hydrocarbons from tight, i.e., low permeability, reservoirs, where hydraulic fracture technology cannot produce crack spacings much less than 1 meter. Just for example, one meter spaced fractures will extract less than 1% pore fluid/year, for fluid pressure in fractures 10 MPa lower than rock, viscosity 0.001 Pa s, porosity 1%, and permeability 10-18 $m^2$, which is a fairly high permeability in a shale gas reservoir.

Reaction driven cracking according to systems and methods of the disclosed subject matter are capable of producing crack spacing at the millimeter to 100 micron scale, which will transform hydrocarbon extraction. Many reservoirs are characterized by low permeability, and currently require hydraulic fracture stimulation. The spacing of hydraulic fractures generally exceeds one meter. This limitation arises from the natural spacing of pre-existing fractures, which are commonly reactivated by high pressure fluid injection, limiting the generation of new fractures. Also, there are practical limitations to the frequency of use and spacing of packers that allow increased fluid pressure within a short depth interval in a borehole. In addition, there are some negative impacts of hydraulic fracture. The high fluid pressure required to fracture tight reservoirs can reduce the normal stress along pre-existing faults, inducing earthquakes. The use of large fluid volumes at high pressure results in production of mixed injection fluid and formation waters, which commonly contain dissolved, radioactive 226Ra and daughter 222Rn, together with other hazardous solutes.

Similarly, reaction driven cracking according to systems and methods of the disclosed subject matter provides improved creation of fracture networks for enhanced geothermal systems, in which hydraulic pressure pulses commonly reactivate existing fractures, rarely produce a crack spacing less than 1 meter, and often create one or a few short circuits, which are rapidly depleted in thermal energy while surrounding rock remains hot. Hydraulic stimulation often fails to produce connectivity between injection and production wells, transports fluid away from production wells, or creates a few large fractures around which thermal energy is rapidly exhausted. In contrast, natural reactive cracking creates a dense network of fractures, and thermal convection through this network sustains nearly constant fluid composition and temperature, controlled by subsurface fluid-rock reactions in natural hydrothermal systems for >100,000 years.

Finally, reaction driven cracking according to systems and methods of the disclosed subject matter provides improved permeability in reservoirs for storage of $CO_2$-rich fluid, but also to an increase in reactive surface area in lithologies in which rapid mineral carbonation is desired for solid $CO_2$ storage, and/or for direct $CO_2$ capture from surface waters such as seawater. In natural systems, one-hundred percent carbonation of rocks is attained, extracting all Mg, Ca, and Fe from silicate minerals to form carbonate minerals, via reaction driven cracking processes that maintain or enhance permeability and reactive surface area. Without reaction driven cracking, in situ mineral carbonation would fill pore space and armor reactive surfaces, limiting reaction progress and leaving much of the silicate unaltered.

Other applications include in situ solution mining of, e.g., uranium, and maintenance of permeability in swelling coal during $CO_2$ injection for coal bed methane production. There are several synergies between the various applications of the disclosed subject matter. For example, $CO_2$ could be used as a heat transfer fluid in enhanced geothermal systems, instead of $H_2O$. Such a process is efficient due to the low viscosity of $CO_2$ fluid, but will likely also result in subsurface mineral carbonation, leading to substantial storage of $CO_2$ in solid minerals, and reaction driven cracking to sustain a permeable fracture network in the thermal reservoir.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method for causing reaction driven cracking in subsurface rock formations, said method comprising:
   drilling one or more holes in a porous subsurface rock formation, said one or more holes in fluid communication with pores in said subsurface rock formation;
   injecting in said pores via at least one of said holes one or more fluids; and
   chemically reacting said one or more fluids within said pores thereby causing cracking in said substantially porous subsurface rock formation;
   wherein said one or more fluids includes a first fluid including a non-toxic solute that is undersaturated in solid crystals and a second fluid including a non-toxic solute that is undersaturated in solid crystals, wherein a combination of said first and second fluids is strongly supersaturated.

2. The method according to claim 1, wherein said one or more fluids include at least one gas.

3. The method according to claim 2, wherein said gas includes carbon dioxide.

4. The method of claim 1, wherein said one or more fluids is at least two fluids, wherein injection of said at least two fluids is substantially simultaneous.

5. The method of claim 1, wherein first and second substantially parallel holes are drilled and injection of said one or more fluids is along substantially parallel flow paths through said first and second substantially parallel holes, respectively.

6. The method of claim 5, wherein a porous mixing region is positioned between said flow paths.

7. The method of claim 1, wherein injection of said one or more fluids is substantially sequential with a first fluid being injected first and a second fluid being injected at a later time.

8. The method of claim 1, wherein said one or more fluids are selected from reagents including dissolved lime, carbon dioxide, nitrogen gas, dissolved periclase, sodium oxide, hydrochloric acid, sulfate, hydrogen sulfate, sodium hydroxide, sodium chloride-rich water, calcium hydroxide, substantially pure water, and a combination thereof.

9. The method of claim 8, wherein said one or more fluids includes pairs of reagents including 1) dissolved lime and carbon dioxide, 2) dissolved periclase and carbon dioxide, 3) sodium oxide and hydrochloric acid, 4) sodium oxide and sulfate, and 5) a combination thereof.

10. The method of claim 1, wherein said chemically reacting step includes dehydration reactions that cause large volume changes in said rock formation.

11. A method for causing reaction driven cracking in subsurface rock formations, said method comprising:
    drilling one or more holes in a porous subsurface rock formation, said one or more holes in fluid communication with pores in said subsurface rock formation;
    injecting in said pores via at least one of said holes one or more fluids, wherein said one or more fluids include a gas; and
    chemically reacting said one or more fluids within said pores thereby causing cracking in said substantially porous subsurface rock formation;
    wherein said one or more fluids includes a first fluid including a non-toxic solute that is undersaturated in solid crystals and a second fluid including a non-toxic solute that is undersaturated in solid crystals, wherein a combination of said first and second fluids is strongly supersaturated.

12. The method of claim 11, wherein said one or more fluids are selected from reagents including dissolved lime, carbon dioxide, nitrogen gas, dissolved periclase, sodium oxide, hydrochloric acid, sulfate, hydrogen sulfate, sodium hydroxide, sodium chloride-rich water, calcium hydroxide, substantially pure water, and a combination thereof.

13. The method of claim 11, wherein said one or more fluids includes pairs of reagents that precipitate during said chemically reacting step to form at least one of calcite, aragonite, magnesite, salt, sodium sulfate salts, and a combination thereof.

14. The method of claim 11, wherein said one or more fluids is at least two fluids, wherein injection of said at least two fluids is substantially simultaneous.

15. The method of claim 11, wherein injection of said one or more fluids is substantially sequential with a first fluid being injected first and a second fluid being injected at a later time.

16. A method of using reaction driven cracking to enhance rates of carbonation of peridotite, said method comprising:
    drilling one or more holes in a porous subsurface peridotite formation, said one or more holes in fluid communication with, pores in said peridotite formation;
    injecting in said pores via at least one of said holes one or more fluids;
    chemically reacting said one or more fluids within said pores thereby causing cracking in a volume of said peridotite formation;
    heating said volume;
    injecting an adjustable flow of carbon dioxide into said volume;
    injecting bicarbonate materials into said volume;
    forming carbonate with said volume and said carbon dioxide in an exothermic reaction thereby generating a self-sustaining heat source, said heat source heating said volume; and
    monitoring a rate of carbonation of said peridotite formation and repeating said drilling, injecting, and chemically reacting steps to cause additional cracking of said peridotite formation when said rate is below a redetermined level.

17. The method of claim 16, wherein said one or more fluids are selected from reagents including dissolved lime, carbon dioxide; nitrogen gas, dissolved periclase, sodium oxide, hydrochloric acid, sulfate, hydrogen sulfate, sodium hydroxide, sodium chloride-rich water, calcium hydroxide, substantially pure water, and a combination thereof.

18. The method of claim 16, further comprising cycling a pressure of said one or more fluids in said volume so as to form both fluid-saturated intervals and fluid-free, drying intervals in said volume.

19. The method of claim 16, wherein said one or more fluids is at least two fluids, wherein injection of said at least two fluids is substantially simultaneous.

20. The method of claim 16, wherein injection of said one or more fluids is substantially sequential with a first fluid being injected first and a second fluid being injected at a later time.

* * * * *